(12) United States Patent
Kim et al.

(10) Patent No.: US 10,367,180 B2
(45) Date of Patent: Jul. 30, 2019

(54) BATTERY PACK

(71) Applicant: Samsung SDI Co., Ltd., Yongin-si, Gyeonggi-do (KR)

(72) Inventors: Junseop Kim, Yongin-si (KR); Daepyo Lee, Yongin-si (KR); Heesung Jung, Yongin-si (KR); Sua Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 477 days.

(21) Appl. No.: 15/136,686

(22) Filed: Apr. 22, 2016

(65) Prior Publication Data

US 2016/0322614 A1    Nov. 3, 2016

(30) Foreign Application Priority Data

Apr. 29, 2015  (KR) .......................... 10-2015-0060715

(51) Int. Cl.
*H01M 2/10* (2006.01)
*H01M 2/20* (2006.01)
*H01M 2/30* (2006.01)

(52) U.S. Cl.
CPC ......... *H01M 2/1077* (2013.01); *H01M 2/206* (2013.01); *H01M 2/305* (2013.01); *H01M 2220/20* (2013.01)

(58) Field of Classification Search
CPC ........................... H01M 2/1077; H01M 2/206
USPC ....................................................... 429/99
See application file for complete search history.

(56) References Cited

U.S. PATENT DOCUMENTS

| 2010/0047676 A1* | 2/2010 | Park ..................... H01M 2/105 429/93 |
| 2012/0003520 A1 | 1/2012 | Lee et al. |
| 2012/0121949 A1* | 5/2012 | Eberhard .............. H01M 2/105 429/82 |
| 2012/0263991 A1 | 10/2012 | Temmyo et al. |
| 2014/0017531 A1* | 1/2014 | Uehara ............... H01M 2/1077 429/82 |
| 2014/0045037 A1* | 2/2014 | Nishikawa .......... H01M 2/0267 429/156 |

FOREIGN PATENT DOCUMENTS

| EP | 2 284 928 | * | 2/2011 |
| JP | 2007-265945 A | | 10/2007 |
| JP | 2009-176689 | * | 8/2009 |
| JP | 2010-97723 A | | 4/2010 |
| KR | 10-1103755 B1 | | 1/2012 |
| WO | WO 2012/073415 A1 | | 6/2012 |

* cited by examiner

*Primary Examiner* — Jayne L Mershon
(74) *Attorney, Agent, or Firm* — Knobbe Martens Olson & Bear LLP

(57) ABSTRACT

A battery pack is disclosed. The battery pack includes a battery holder, a lead terminal, a bus bar, and a pack case. The battery holder includes a cell holder accommodating a plurality of battery cells and a flange extending outwardly from the cell holder. The lead terminal includes a lead plate and a lead tab, the lead plate covering electrodes of the battery cells, and the lead tab extending from the lead plate toward the flange. The bus bar is configured to form an electrical path between the lead tab and an external terminal. The pack case includes a coupler, and the external terminal is formed on the pack case. A fastener is inserted into the bus bar, the lead tab, and the flange, and the fastener is engages with the coupler.

21 Claims, 5 Drawing Sheets

BATTERY PACK

CROSS-REFERENCE TO RELATED APPLICATION

This application claims the benefit of Korean Patent Application No. 10-2015-0060715, filed on Apr. 29, 2015, in the Korean Intellectual Property Office, the disclosure of which is incorporated herein in its entirety by reference.

BACKGROUND

Field

The described technology generally relates to a battery pack.

Description of the Related Technology

Unlike primary batteries, secondary batteries are rechargeable and can be used to power devices such as mobile devices, electric vehicles, hybrid electric vehicles, electric bicycles, and uninterruptible power supplies. Single-cell secondary batteries or multi-cell secondary battery modules (secondary battery packs) including multiple battery cells connected to one another are used according to the type of device and require power.

Small mobile devices such as cellular phones can be operated for a predetermined time using single-cell secondary batteries. However, multi-cell battery modules having high-output, high-capacity features are generally more suitable for devices having long operating times and consuming large amount of power such as electric vehicles and hybrid electric vehicles. The output voltages or currents of multi-cell battery modules can increase by adjusting the number of battery cells included in the multi-cell battery modules.

SUMMARY OF CERTAIN INVENTIVE ASPECTS

One inventive aspect relates to a battery pack that can be manufactured through fewer manufacturing processes and have an improved and simplified structure.

Another aspect is a battery pack that includes: a holder unit including a cell holder accommodating battery cells and a flange extending outward from the cell holder; a lead member including a lead plate and a lead tab, the lead plate being configured to cover electrodes of the battery cells exposed at sides of the cell holder, the lead tab extending from the lead plate toward the flange; and a bus bar forming an electrical path between the lead tab and an external terminal; and a pack case including a coupling part, wherein the external terminal is formed on the pack case, and a fastening member inserted into the bus bar, the lead tab, and the flange is coupled to the coupling part.

For example, the lead tab and the bus bar are disposed on the coupling part in contact with each other.

For example, the flange, the lead tab, and the bus bar are sequentially placed on the coupling part, and the fastening member is inserted into coupling holes of the bus bar, the lead tab, and the flange and coupled to the coupling part.

For example, the flange, the lead tab inserted into a coupling hole of the flange, and the bus bar are sequentially placed on the coupling part, and the fastening member is inserted into coupling holes of the bus bar and the lead tab and coupled to the coupling part.

For example, the coupling part includes first and second coupling parts respectively formed at first and second coupling positions on opposite sides of the pack case.

For example, the flange includes first and second flanges respectively formed at the first and second coupling positions, the lead tab includes first and second lead tabs respectively placed at the first and second coupling positions, and the bus bar includes first and second bus bars respectively placed at the first and second coupling positions.

For example, the first lead tab extends downward toward the first flange from a first lead plate placed on an upper surface of the cell holder, and the second lead tab can extend upward toward the second flange from a second lead plate placed on a lower surface of the cell holder.

For example, the first lead tab is exposed at an upper side of the first flange and makes contact with the first bus bar, and the second lead tab is exposed upward through a coupling hole of the second flange and can make contact with the second bus bar.

For example, the cell holder has four sides to accommodate a matrix array of the battery cells arranged in columns and rows, and the pack case includes a rectangular frame having four sides to accommodate the cell holder.

For example, the external terminal includes first and second external terminals, and the first and second external terminals are formed on the same side of the pack case.

For example, the first coupling position is located on a side of the cell holder directly facing the side of the pack case on which the first and second external terminals are formed, and the second coupling position is located on a side of the cell holder opposite the side of the pack case on which the first and second external terminals are formed.

For example, the first bus bar linearly extends from the first coupling position toward the first external terminal.

For example, the second bus bar extends from the second coupling position toward the second external terminal while surrounding a portion of the cell holder.

For example, the second bus bar is wider than the first bus bar.

For example, the fastening member is a screw inserted into the bus bar, the lead tab, and the flange, and coupled to the coupling part.

For example, the cell holder includes first and second cell holders coupled to each other in mutually-facing vertical directions with the battery cells being disposed therebetween.

For example, the cell holder includes ribs that form a plurality of cell spaces respectively accommodating the battery cells and isolate the battery cells from each other.

Another aspect is a battery pack, comprising: a battery holder comprising a cell holder accommodating a plurality of battery cells and a flange extending outwardly from the cell holder; a lead terminal comprising a lead plate and a lead tab, wherein the lead plate covers electrodes of the battery cells, and wherein the lead tab extends from the lead plate toward the flange; a bus bar configured to form an electrical path between the lead tab and an external terminal; and a pack case comprising a coupler, wherein the external terminal is formed on the pack case, wherein a fastener is inserted into the bus bar, the lead tab, and the flange, and wherein the fastener is engages with the coupler.

In the above battery pack, the lead tab and the bus bar are placed on the coupler and contact each other.

In the above battery pack, the flange, the lead tab, and the bus bar are sequentially placed on the coupler, wherein the fastener is inserted into coupling holes of the bus bar, the lead tab, and the flange and engages with the coupler.

In the above battery pack, the flange, the lead tab inserted into a coupling hole of the flange, and the bus bar are sequentially placed on the coupler, wherein the fastener is inserted into coupling holes of the bus bar and the lead tab and engages with the coupler.

In the above battery pack, the coupler comprises first and second coupling portions respectively formed at first and second coupling positions on opposite sides of the pack case.

In the above battery pack, the flange comprises first and second flanges respectively formed at the first and second coupling positions, wherein the lead tab comprises first and second lead tabs respectively placed at the first and second coupling positions, and wherein the bus bar comprises first and second bus bars respectively placed at the first and second coupling positions.

In the above battery pack, the first lead tab extends downward toward the first flange from a first lead plate placed on an upper surface of the cell holder in the depth dimension of the battery pack, wherein the second lead tab extends upward toward the second flange from a second lead plate placed on a lower surface of the cell holder in the depth dimension.

In the above battery pack, the first lead tab is exposed at an upper side of the first flange and contacts the first bus bar, wherein the second lead tab is exposed upwardly via a coupling hole of the second flange and contacts the second bus bar.

In the above battery pack, the cell holder has four sides configured to accommodate a matrix array of the battery cells arranged in columns and rows, wherein the pack case comprises a substantially rectangular frame having four sides accommodating the cell holder.

In the above battery pack, the external terminal comprises first and second external terminals, wherein the first and second external terminals are formed on the same side of the pack case.

In the above battery pack, the first coupling position is located on a side of the cell holder directly facing the side of the pack case on which the first and second external terminals are formed, wherein the second coupling position is located on a side of the cell holder opposite the side of the pack case on which the first and second external terminals are formed.

In the above battery pack, the first bus bar linearly extends from the first coupling position toward the first external terminal.

In the above battery pack, the second bus bar extends from the second coupling position toward the second external terminal, wherein the second bus bar at least partially surrounds a portion of the cell holder.

In the above battery pack, the second bus bar is wider than the first bus bar.

In the above battery pack, the fastener includes a screw inserted into the bus bar, the lead tab, and the flange, wherein the fastener is engages with the coupler.

In the above battery pack, the cell holder comprises first and second cell holders engages with each other in mutually-facing vertical directions, wherein the battery cells are placed between the first and second cell holders.

In the above battery pack, the cell holder comprises a plurality of ribs that accommodate the battery cells and are configured isolate the battery cells from one another.

Another aspect is a battery pack, comprising: a cell holder accommodating a plurality of battery cells; a flange extending from a exterior side surface of the cell holder and having a plurality of holes; a lead plate covering electrodes of the battery cells and formed over the flange; a lead tab extending toward the flange and having a plurality of holes; and a fastener inserted into the holes of the lead tab and the flange.

The above battery pack further comprises a bus bar configured to form an electrical path between the lead tab and an external terminal and having a plurality of holes, wherein each of the bus bar, the lead tab and the flange are formed on opposing sides of the battery pack.

The above battery pack further comprises a pack case having a plurality of holes and configured to accommodate the bus bar, the lead tab and the flange, wherein the fastener penetrates all of the holes so as to fix the bus bar, the lead tab and the flange to one another.

DETAILED DESCRIPTION OF CERTAIN INVENTIVE EMBODIMENTS

Figure 1:
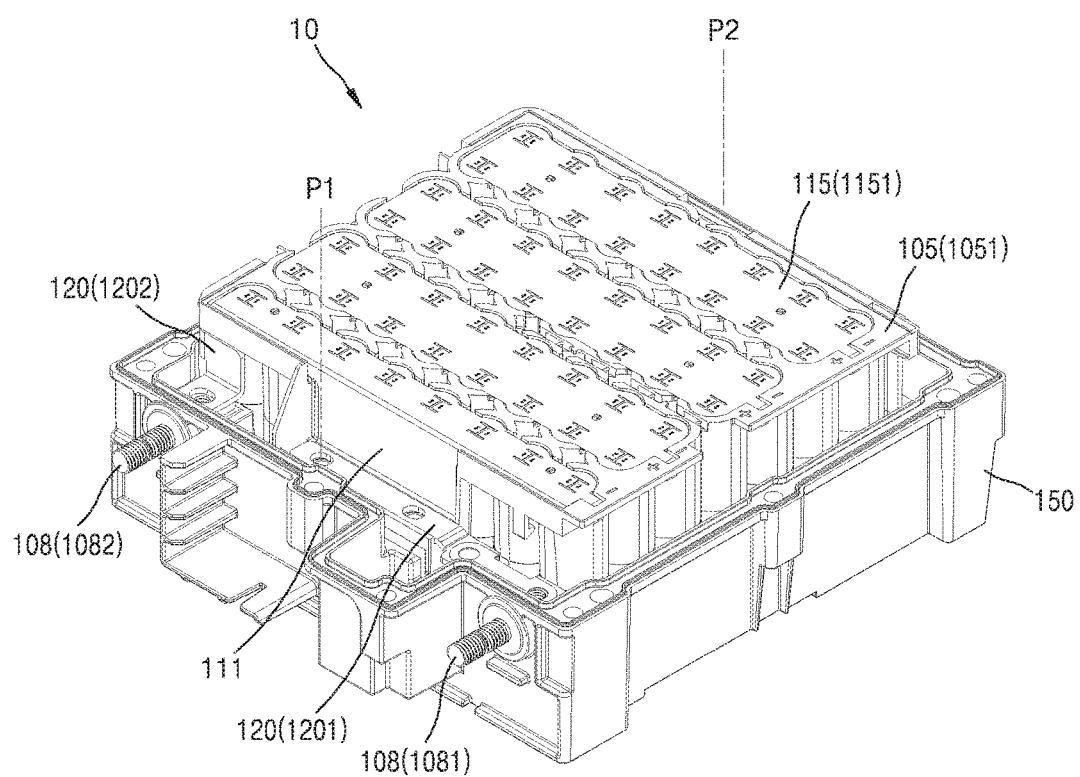
FIG. 1 is a perspective view illustrating a battery pack according to an exemplary embodiment.

Reference will now be made in detail to exemplary embodiments, examples of which are illustrated in the accompanying drawings, wherein like reference numerals refer to like elements throughout. In this regard, the present exemplary embodiments can have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed. In this disclosure, the term "substantially" includes the meanings of completely, almost completely or to any significant degree under some applications and in accordance with those skilled in the art. Moreover, "formed on" can also mean "formed over." The term "connected" can include an electrical connection.

A battery pack will now be described in detail with reference to the accompanying drawings, in which exemplary embodiments are shown.

Figure 2:
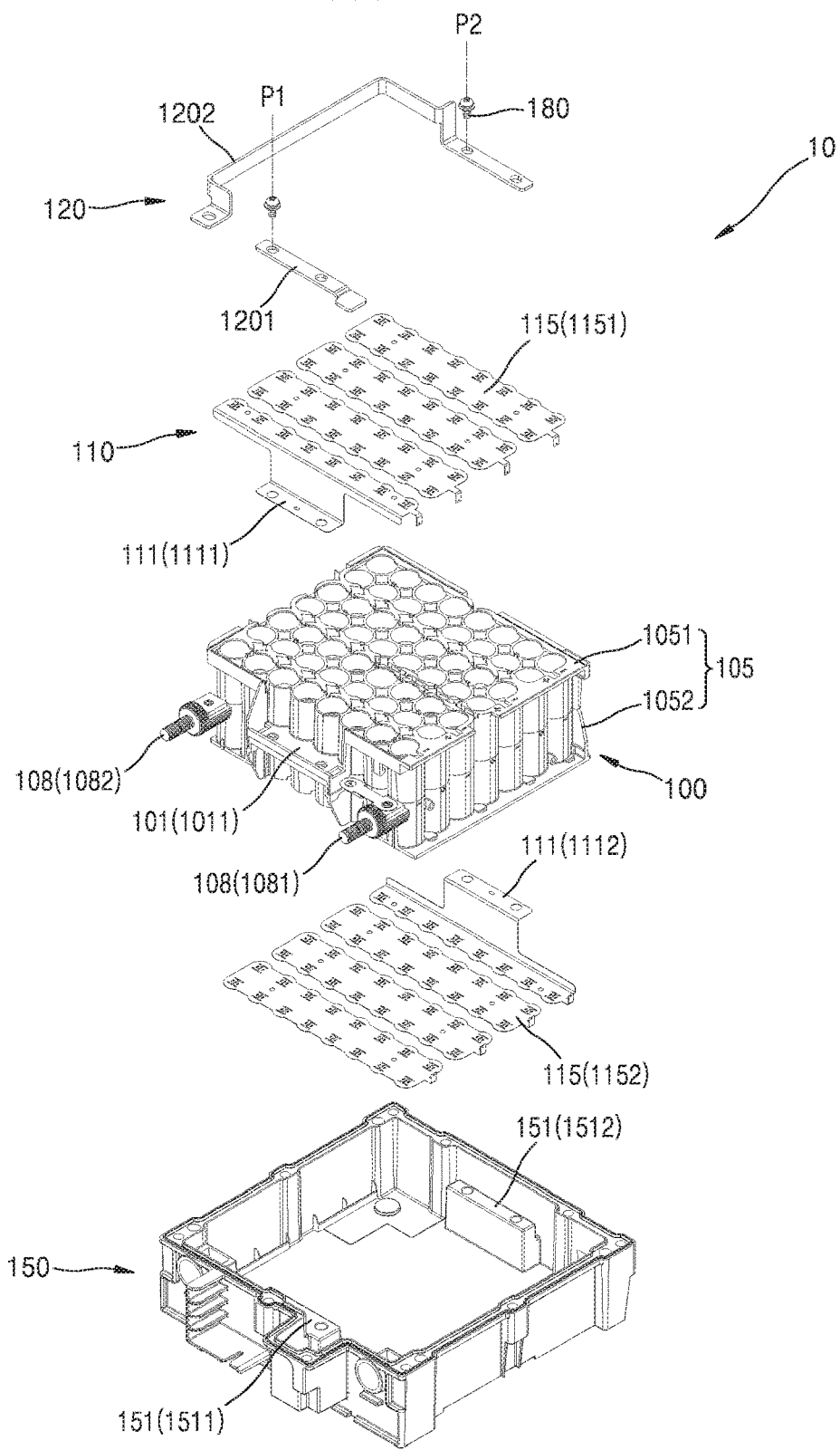
FIG. 2 is an exploded perspective view illustrating the battery pack depicted in FIG. 1.
Figure 3:
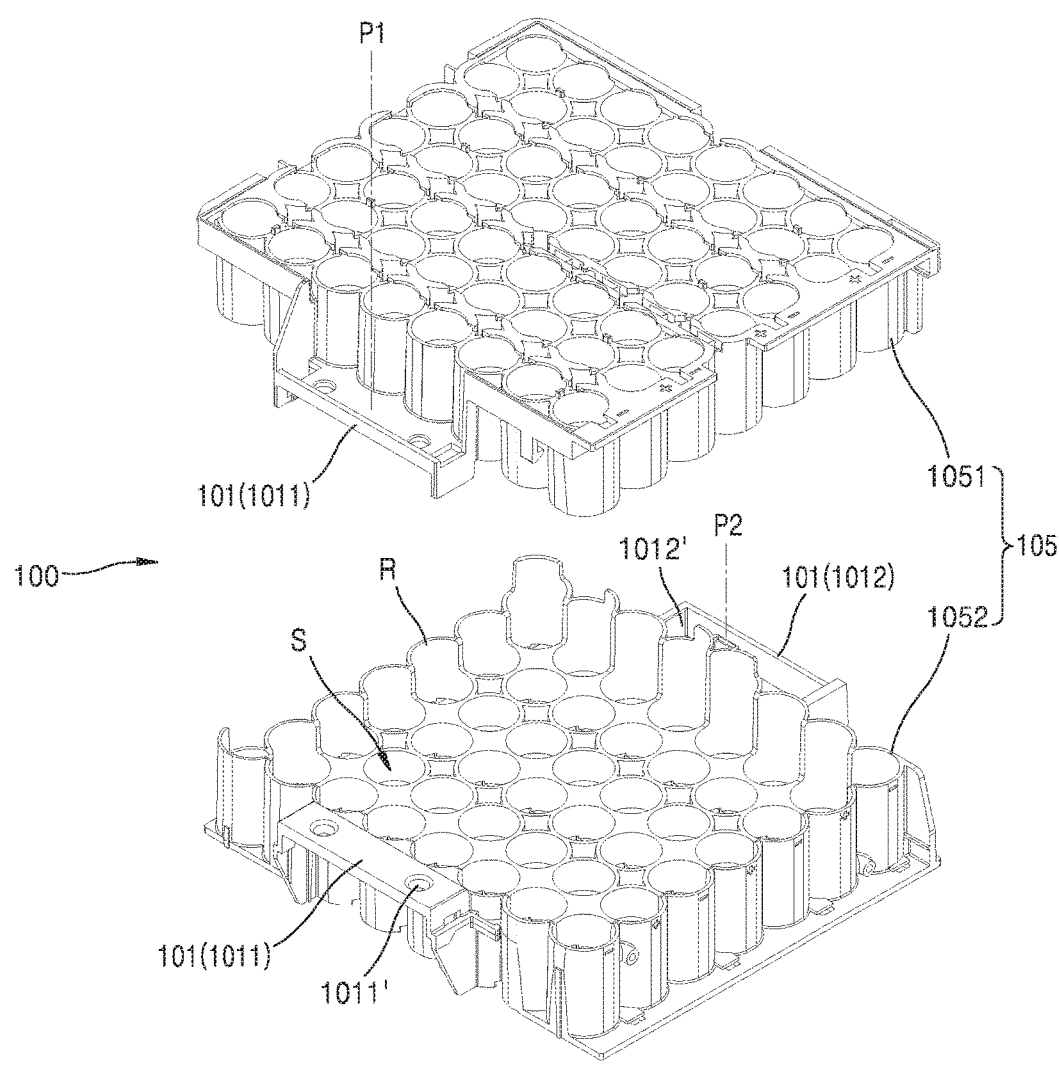
FIG. 3 is an exploded perspective view illustrating a holder unit depicted in FIG. 2.

FIG. 1 is a perspective view illustrating a battery pack 10 according to an exemplary embodiment. FIG. 2 is an exploded perspective view illustrating the battery pack 10 depicted in FIG. 1. FIG. 3 is an exploded perspective view illustrating a holder unit or battery holder 100 depicted in FIG. 2.

Referring to FIG. 2, the battery pack includes: the holder unit 100 including a cell holder 105 in which battery cells (not shown) are placed, and flanges 101 extending outward from the cell holder 105; lead members 110 including lead plates 115 covering exposed electrodes of the battery cells disposed in the cell holder 105, and lead tabs 111 extending from the lead plates 115 toward the flanges 101; and bus bars 120 forming electrical paths between the lead tabs 111 and external terminals 108. In addition, the battery pack further includes a pack case 150 to which the external terminals 108 are coupled, and the pack case 150 includes coupling parts 1151 to which fastening members 180 inserted into the flanges 101, the lead tabs 111, and the bus bars 120 are coupled.

Referring to FIG. 3, the holder unit 100 includes: the cell holder 105 in which the battery cells are placed; and the flanges 101 extending outward from the cell holder 105. The cell holder 105 forms a plurality of cell spaces S to receive the battery cells. For example, the cell holder 105 forms cylindrical cell spaces S to receive circular battery cells. The cell holder 105 can form a plurality of cell spaces S respectively corresponding to the battery cells. The cell holder 105 can include a pair of first and second cell holders 1051 and 1052 configured to be coupled to each other in mutually-facing directions with the battery cells being placed therebetween.

Ribs R can be formed on the first and second cell holders 1051 and 1052 to regularly arrange the battery cells and separate the battery cells from each other. The ribs R can have a cylindrical shape to respectively support the battery cells and form the cell spaces S. For example, the ribs R are formed on the cell holder 105 to regularly arrange the battery cells in columns and rows.

For example, the cell holder 105 includes four sides to receive a matrix array in which the battery cells are arranged in columns and rows. As described later, the pack case 150 can include a rectangular frame having four sides to receive the cell holder 105. In the exemplary embodiment, the shape of the cell holder 105 and the arrangement of the battery cells can be varied according to specific designs and are not limited to the illustrated shape and arrangement.

The flanges 101 can include a pair of first and second flanges 1011 and 1012 formed on one side and another side of the cell holder 105. The first and second flanges 1011 and 1012 can be respectively formed at first and second coupling positions P1 and P2 that are opposite each other. The first and second coupling positions P1 and P2 will be described later in more detail.

Referring to FIGS. 2 and 3, the flanges 101 extend outward from the cell holder 105 and are coupled to the pack case 150 for fixing the cell holder 105. For example, the flanges 101 are used to couple the cell holder 105 to the pack case 150 and thus, to fix the cell holder 105. Coupling holes 1011' and 1012' can be formed in the flanges 101 for coupling to the pack case 150. For example, the fastening members 180 are inserted into the flanges 101 and coupled to the pack case 150 for fixing the cell holder 105.

Referring to FIG. 2, the lead members 110 include: the lead plates 115 configured to cover the exposed electrodes of the battery cells disposed in the cell holder 105; and the lead tabs 111 extending from the lead plates 115 toward the flanges 101. Different electrodes can be formed on both ends of each of the battery cells, and the electrodes of the battery cells can be exposed at sides of the first and second cell holders 1051 and 1052. The exposed electrodes of the battery cells can be electrically connected through the lead plates 115. That is, the battery cells can be electrically connected in series, parallel, or series-parallel according to a required level of electrical output power.

The lead plates 115 can include a first lead plate 1151 placed on an upper surface of the cell holder 105 and a second lead plate 1152 placed on a lower surface of the cell holder 105. For example, the first lead plate 1151 is placed on an outer side of the first cell holder 1051, for example, an upper surface of the first cell holder 1051, and the second lead plate 1152 is placed on an outer side of the second cell holder 1052, for example, a lower surface of the second cell holder 1052.

The first lead plate 1151 can cover electrodes formed on ends of the battery cells and exposed at the first cell holder 1051, and the second lead plate 1152 can cover electrodes formed on the other ends of the battery cells and exposed at the second cell holder 1052. For example, the first lead plate 1151 connects the electrodes formed on said ends of the battery cells and exposed at the first cell holder 1051, and the second lead plate 1152 connects the electrodes formed on the other ends of the battery cells and exposed at the second cell holder 1052. The first and second lead plates 1151 and 1152 can alternately connect the electrodes formed on the said end and the other ends of the battery cells and exposed at the first and second cell holders 1051 and 1052, so as to connect the battery cells in series.

In the exemplary embodiment, the battery cells disposed in the battery pack are connected in series, parallel, or series-parallel according to a required level of electrical output power. The battery cells can be variously modified without being limited to the illustrated configuration.

The lead tabs 111 can be placed on the flanges 101 that are formed on a lateral side and another lateral side of the cell holder 105. The lead tabs 111 can include first and second lead tabs 1111 and 1112 having different polarities and placed at the first and second coupling positions P1 and P2.

The first lead tab 1111 is electrically connected to the first lead plate 1151, and the second lead tab 1112 is electrically connected to the second lead plate 1152. For example, the first lead tab 1111 is formed in one piece with and extend from the first lead plate 1151 placed on the upper surface of the cell holder 105. The second lead tab 1112 can be formed in one piece with and extend from the second lead plate 1152 placed on the lower surface of the cell holder 105.

The first and second lead tabs 1111 and 1112 can be electrically connected to the external terminals 108 through first and second bus bars 1201 and 1202. As described later, the external terminals 108 are exposed at an outer side of the pack case 150 and can be connected to an external device such as an electric load or a battery charger for forming a charging/discharging current path.

The flanges 101 connect the cell holder 105 and the pack case 150 for fixing the cell holder 105. In addition to the function of fixing the cell holder 105, the flanges 101 can also have a function of supporting the lead tabs 111. For example, the first lead tab 1111 extends downward from the first lead plate 1151 placed on the upper surface of the cell holder 105, and then is supported on the first flange 1011. Coupling holes can be formed in the first lead tab 1111 supported on the first flange 1011. Fastening members 180 can be sequentially inserted into the first lead tab 1111 and the first flange 1011 and coupled to the pack case 150 so as to fix both the first lead tab 1111 and the first flange 1011, that is, the first lead plate 1151 connected to the first lead tab 1111 and the cell holder 105 connected to the first flange 1011. The first flange 1011 and the first lead plate 1151 can be coupled to each other at the first coupling position P1.

The second lead tab 1112 can extend upward from the second lead plate 1152 placed on the lower surface of the cell holder 105, and then can be supported on the second flange 1012. Coupling holes can be formed in the second lead tab 1112 supported on the second flange 1012. Fastening members 180 can be sequentially inserted into the second lead tab 1112 and the second flange 1012 and coupled to the pack case 150 so as to fix both the second lead tab 1112 and the second flange 1012, that is, the second lead plate 1152 connected to the second lead tab 1112 and the cell holder 105 connected to the second flange 1012. In this case, the second lead tab 1112 can be inserted into the coupling hole 1012' (refer to FIG. 3) of the second flange 1012. Then, the fastening members 180 can be inserted into the second lead tab 1112 and coupled to the pack case 150 so as to fix both the second lead tab 1112 and the second flange 1012. For example, since the second lead tab 1112 is fixed to the pack case 150, the second flange 1012 into which the second lead tab 1112 is inserted is fixed. The second lead tab 1112 can be supported on the second flange 1012. The second lead tab 1112 can be inserted into the coupling hole 1012' of the second flange 1012 for guiding the second lead tab 1112 to an assembling position. In this manner, the second lead tab 1112 can be supported by the second flange 1012. The second lead tab 1112 and the second flange 1012 can be coupled to each other at the second coupling position P2.

The bus bars 120 can be placed at the first and second coupling positions at which the lead tabs 111 and the flanges 101 are coupled to each other. For example, the bus bars 120 overlap with the lead tabs 111 for electric connection with the lead tabs 111. For example, the bus bars 120 include the first bus bar 1201 placed at the first coupling position P1 and the second bus bar 1202 placed at the second coupling position P2. The first bus bar 1201 can be superposed on the first lead tab 1111 for electric connection with the first lead tab 1111, and the second bus bar 1202 can be overlapped with the second lead tab 1112 for electric connection with the second lead tab 1112.

Coupling holes can be formed in the bus bars 120 at positions corresponding to coupling holes of the lead tabs 111. For example, the fastening members 180 are inserted into the bus bars 120, the lead tabs 111, and the flanges 101 and coupled to the pack case 150 for fixing all the bus bars 120, the lead tabs 111, and the flanges 101. For example, a task for mechanically fixing the cell holder 105 and a task for forming a charging/discharging current path by electrically connecting the external terminals 108 to the battery cells disposed in the cell holder 105 can be accomplished in one action, that is, by tightening the fastening members 180. That is, if the fastening members 180 are inserted into the bus bars 120, the lead tabs 111, and the flanges 101 of the cell holder 105, and are coupled to the pack case 150, fixation of the cell holder 105 and electrical connection between the lead tabs 111 and the bus bars 120 can be simultaneously accomplished.

As described above, the first lead tab 1111 can extend downward from the first lead plate 1151 placed on the upper surface of the cell holder 105 toward the first flange 1011. In this case, the first lead tab 1111 can be exposed at an upper surface of the first flange 1011 and make contact with the first bus bar 1201. The second lead tab 1112 can extend upward from the second lead plate 1152 placed on the lower surface of the cell holder 105 toward the second flange 1012. In this case, the second lead tab 1112 can be exposed at an upper side of the second flange 1012 through the coupling hole 1012' (refer to FIG. 3) and brought into contact the second bus bar 1202.

In a comparative example, a task for mechanically fixing the cell holder 105 and a task for electrically connecting the external terminals 108 and the battery cells disposed in the cell holder 105 can be carried out by using separate coupling structures. In this case, the number of assembling processes can be increased, and the structure of the battery pack can be complicated. However, according to the exemplary embodiment, the fixation of the cell holder 105 and the electrical connection of the battery cells are accomplished in one coupling action, thereby decreasing the number of assembling processes and simplifying the structure of the battery pack.

The cell holder 105 is placed inside the pack case 150. A cover (not shown) can be placed above the cell holder 105, and the cover and the pack case 150 can be coupled to each other in mutually-facing directions with the cell holder 105 being disposed therebetween.

The external terminals 108 are formed at the pack case 150. The external terminals 108 can be exposed at an outer side of the pack case 150 and can be connected to an external device such as an electric load or a battery charger for forming a charging/discharging current path.

The external terminals 108 are electrically connected to the battery cells disposed inside the battery pack. For example, the bus bars 120 are connected to the external terminals 108. Thus, the bus bars 120 can be connected through the bus bars 120 and the lead tabs 111 to the battery cells connected to the lead plates 115. The external terminals 108 can include first and second external terminals 1081 and 1082 having different polarities. The first external terminal 1081 can be electrically connected to the first lead plate 1151 through the first bus bar 1201 and the first lead tab 1111, and the second external terminal 1082 can be electrically connected to the second lead plate 1152 through the second bus bar 1202 and the second lead tab 1112. In this manner, the first and second external terminals 1081 and 1082 can be electrically connected to the first and second lead plates 1151 and 1152 which are connected to the electrodes formed on both ends of the battery cells.

The coupling parts 151 can be formed on the pack case 150. For example, a pair of first and second coupling parts 1511 and 1512 are formed on a side and another side of the pack case 150. The first and second coupling parts 1511 and 1512 can be respectively formed at the first and second coupling positions P1 and P2. For example, coupling holes can be formed in the coupling parts 151 for receiving the fastening members 180. The flanges 101, the lead tabs 111 supported by the flanges 101, and the bus bars 120 superposed on the lead tabs 111 can be placed on the coupling parts 151. Then, the fastening members 180 can be inserted into the bus bars 120, the lead tabs 111, and the flanges 101, and coupled to the pack case 150, so that as to fix the flanges 101 and electrically connect the lead tabs 111 and the bus bars 120 in a simultaneous manner. For example, the fastening members 180 are screws configured to be coupled to the coupling parts 151.

For example, the first flange 1011, the first lead tab 1111, and the first bus bar 1201 are sequentially placed on the first coupling part 1511, and the fastening members 180 are inserted into coupling holes of the first bus bar 1201, the first lead tab 1111, and the first flange 1011 and coupled to the first coupling part 1511. Similarly, the second flange 1012 (refer to FIG. 3), the second lead tab 1112 inserted into the coupling hole 1012' (refer to FIG. 3), and the second bus bar 1202 can be sequentially placed on the second coupling part 1512, and the fastening members 180 can be inserted into coupling holes of the second bus bar 1202 and the second lead tab 1112 and coupled to the second coupling part 1512.

The external terminals 108 include the first and second external terminals 1081 and 1082 having different polarities, and the first and second external terminals 1081 and 1082 can be formed on the same side of the pack case 150. For example, the cell holder 105 has four sides to receive a matrix array in which the battery cells are arranged in columns and rows, and the pack case 150 can include a rectangular frame having four sides to receive the cell holder 105. In this case, the first and second external terminals 1081 and 1082 can be formed on the same side of the pack case 150.

The first coupling position P1 can be located at a side of the cell holder 105 directly facing the side of the pack case 150 on which the external terminals 108 are formed. The second coupling position P2 can be located at another side of the cell holder 105 opposite the side of the pack case 150 on which the external terminals 108 are formed.

The flanges 101 can include the first and second flanges 1011 and 1012 (refer to FIG. 3) respectively located at the first and second coupling positions P1 and P2. The lead tabs 111 can include the first and second lead tabs 1111 and 1112 respectively located at the first and second coupling positions P1 and P2. The bus bars 120 can include the first and second bus bars 1201 and 1202 respectively located at the first and second coupling positions P1 and P2. The first flange 1011, the first lead tab 1111, and the first bus bar 1201 located at the first coupling position P1 can be fixed to the first coupling part 1511 using the same fastening members 180. Similarly, the second flange 1012 (refer to FIG. 3), the second lead tab 1112, and the second bus bar 1202 located at the second coupling position P2 can be fixed to the second coupling part 1512 using the same fastening members 180.

The first bus bar 1201 extends from the first coupling position P1 to the first external terminal 1081. For example, the first bus bar 1201 linearly extends to the first external terminal 1081 which is relatively close to the first coupling position P1.

The second bus bar 1202 extends from the second coupling position P2 to the second external terminal 1082. For example, the second bus bar 1202 extends along a bypass surrounding a portion of the cell holder 105 toward the second external terminal 1082 which is relatively distant from the second coupling position P2. As described above, the second coupling position P2 is relatively distant from the external terminals 108. In this case, the second bus bar 1202 connecting the second coupling position P2 and the second external terminal 1082 extends from the second coupling position P2 to the second external terminal 1082 along a bypass surrounding a portion of the cell holder 105. The second bus bar 1202 extending along a bypass surrounding a portion of the cell holder 105 can prevent movement or shaking of the cell holder 105 and protect the cell holder 105.

For example, the battery pack is installed in a vehicle such as automobiles or golf carts as a power source and thus can be impacted by external vibrations. In this case, according to the exemplary embodiment, since the second bus bar 1202 surrounds the cell holder 105, the movement or shaking of the cell holder 105 can be suppressed, and thus the battery pack can be resistant to vibrations.

The second bus bar 1202 can have sufficient strength for firmly fixing the cell holder 105 while surrounding a portion of the cell holder 105. For example, the second bus bar 1202 is formed of a metal part having a sufficient thickness and width so that the second bus bar 1202 can have sufficient strength and low electric resistance for forming a path for a large charging/discharging current.

The first bus bar 1201 can be formed of the same metallic material as that used to form the second bus bar 1202 so that the first and second bus bars 1201 and 1202 can have equivalent levels of electric resistance. In this case, although the first bus bar 1201 connects the first coupling position P1 and the first external terminal 1081 that are relatively close, the second bus bar 1202 connects the second coupling position P2 and the second external terminal 1082 that are relatively distant. Therefore, the second bus bar 1202 can have a cross-section area greater than that of the first bus bar 1201. For example, the second bus bar 1202 can be wider than the first bus bar 1201. If the second bus bar 1202 has a relatively wide width as described, the second bus bar 1202 can have sufficient mechanical strength for stably protecting the cell holder 105.

Figure 4:
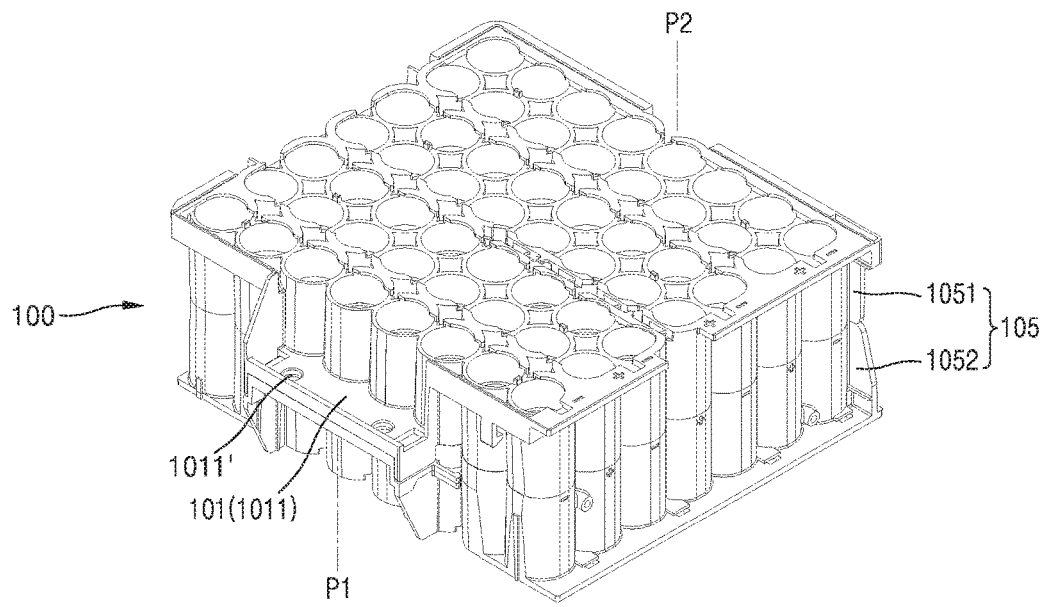
FIGS. 4 and 5 are perspective views illustrating first and second coupling positions depicted in FIG. 3.
Figure 5:
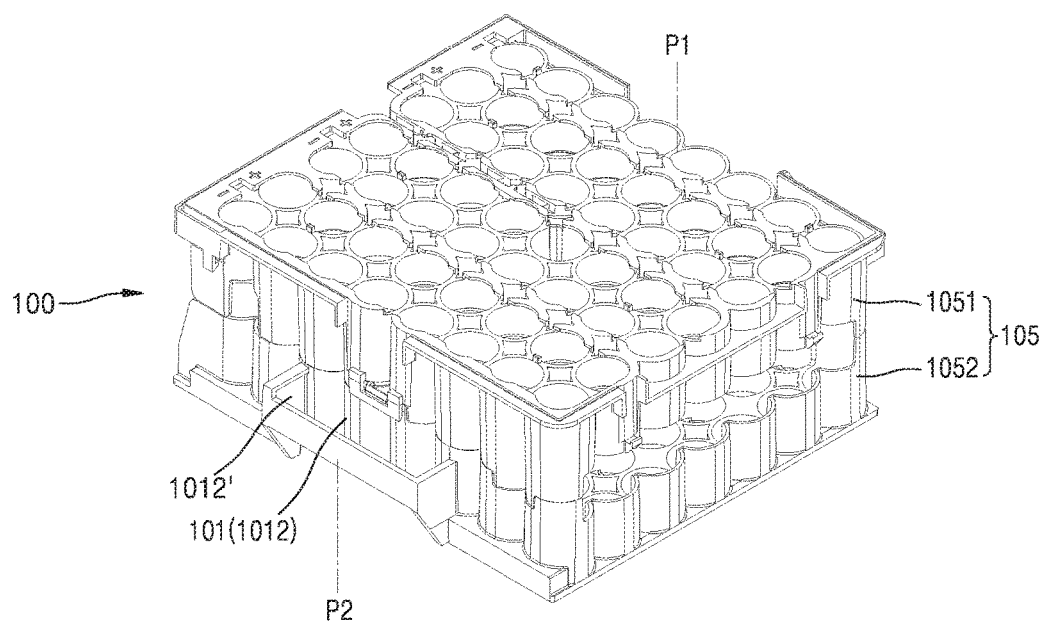

FIGS. 4 and 5 are perspective views illustrating the first and second coupling positions P1 and P2 depicted in FIG. 3. Referring to FIGS. 4 and 5, the first and second flanges 1011 and 1012 in which the coupling holes 1011' and 1012' are respectively formed are located at the first and second coupling positions P1 and P2 on opposite sides of the cell holder 105.

Figure 6:
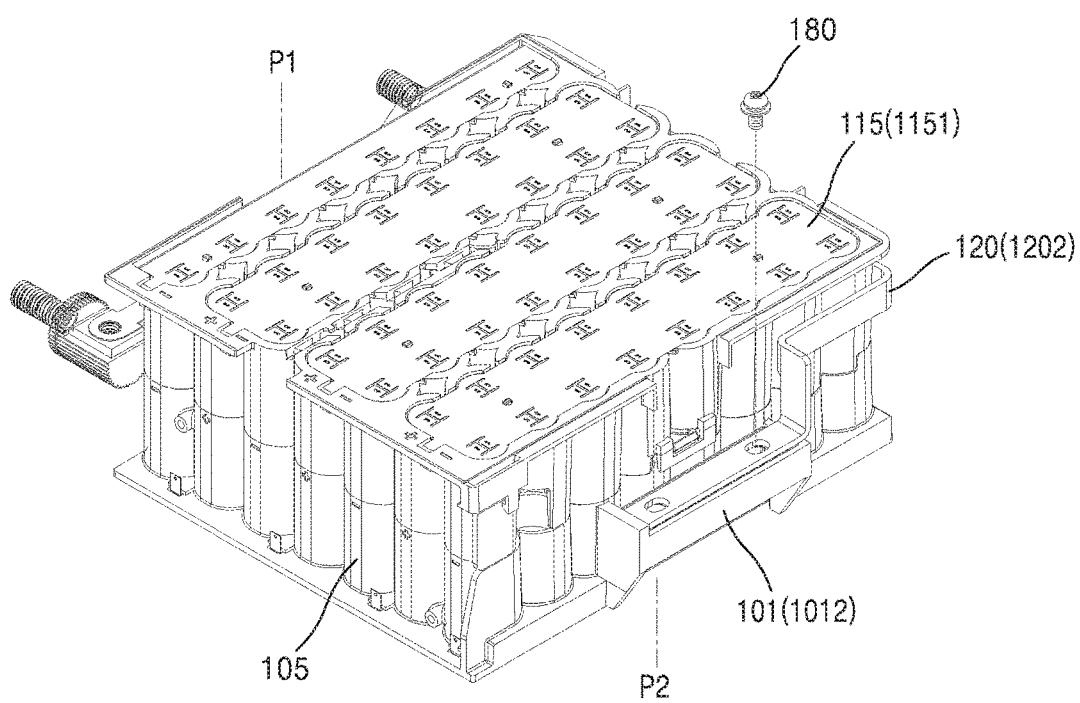
FIG. 6 is a view illustrating a second bus bar located at the second coupling position.

FIG. 6 is a view illustrating the second bus bar 1202 located at the second coupling position P2. Referring to FIG. 6, the second bus bar 1202 is placed on the second flange 1012 and electrically connected to the second lead tab 1112 (refer to FIG. 2) extending from the second flange 1012 toward the lower surface of the cell holder 105.

According to at least one of the disclosed embodiments, the fixation of the cell holder 105 to which the battery cells are fixed, and the electrical connection between the battery cells and the external terminals 108 are accomplished in one coupling action. Therefore, the number of assembling processes can be decreased, and the battery pack can have a simple structure.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope as defined by the following claims.

What is claimed is:
1. A battery pack, comprising:
a battery holder comprising a cell holder accommodating a plurality of battery cells and a flange formed on a lateral side of the cell holder, wherein at least one coupling hole is formed in the flange;
a lead terminal comprising a lead plate and a lead tab, wherein the lead plate covers electrodes of the battery cells, wherein the lead tab extends from the lead plate toward the flange, wherein the lead tab includes a first portion downwardly extending from an end of the lead plate and a second portion outwardly extending from the first portion, wherein the first and second portions are formed on different planes, wherein at least one coupling hole is formed in the second portion of the lead tab, and wherein the second portion of the lead tab does not vertically overlap the lead plate;
a bus bar configured to form an electrical path between the lead tab and an external terminal, wherein at least one coupling hole is formed in the bus bar; and
a pack case comprising a coupler, wherein the external terminal is formed on the pack case, wherein a fastener is inserted into the at least one coupling hole of the bus bar, the at least one coupling hole of the second portion of the lead tab, and the at least one coupling hole of the flange, and wherein the fastener is engaged with the coupler.

2. The battery pack of claim 1, wherein the lead tab and the bus bar are placed on the coupler and contact each other.

3. The battery pack of claim 1, wherein the flange, the lead tab, and the bus bar are sequentially placed on the coupler, and wherein the fastener is inserted into the coupling holes of the bus bar, the lead tab, and the flange and is engaged with the coupler.

4. The battery pack of claim 1, wherein the coupler comprises first and second coupling portions respectively formed at first and second coupling positions on opposite sides of the pack case.

5. The battery pack of claim 4, wherein the flange comprises first and second flanges respectively formed at the first and second coupling positions, wherein the lead tab comprises first and second lead tabs respectively placed at the first and second coupling positions, and wherein the bus bar comprises first and second bus bars respectively placed at the first and second coupling positions.

6. The battery pack of claim 5, wherein the first lead tab extends downward toward the first flange from a first lead plate placed on an upper surface of the cell holder in the depth dimension of the battery pack, and wherein the second lead tab extends upward toward the second flange from a second lead plate placed on a lower surface of the cell holder in the depth dimension.

7. The battery pack of claim 6, wherein the first lead tab is exposed at an upper side of the first flange and contacts the first bus bar, and wherein the second lead tab is exposed upwardly via a coupling hole of the second flange and contacts the second bus bar.

8. The battery pack of claim 5, wherein the cell holder has four sides configured to accommodate a matrix array of the battery cells arranged in columns and rows, and wherein the pack case comprises a substantially rectangular frame having four sides accommodating the cell holder.

9. The battery pack of claim 8, wherein the external terminal comprises first and second external terminals, and wherein the first and second external terminals are formed on the same side of the pack case.

10. The battery pack of claim 9, wherein the first coupling position is located on a side of the cell holder directly facing the side of the pack case on which the first and second external terminals are formed, and wherein the second coupling position is located on a side of the cell holder opposite the side of the pack case on which the first and second external terminals are formed.

11. The battery pack of claim 10, wherein the first bus bar linearly extends from the first coupling position toward the first external terminal.

12. The battery pack of claim 10, wherein the second bus bar extends from the second coupling position toward the second external terminal, and wherein the second bus bar at least partially surrounds a portion of the cell holder.

13. The battery pack of claim 10, wherein the second bus bar is wider than the first bus bar.

14. The battery pack of claim 1, wherein the fastener includes a screw inserted into the bus bar, the lead tab, and the flange, and wherein the fastener is engaged with the coupler.

15. The battery pack of claim 1, wherein the cell holder comprises first and second cell holders engaged with each other in mutually-facing vertical directions, and wherein the battery cells are placed between the first and second cell holders.

16. The battery pack of claim 1, wherein the cell holder comprises a plurality of ribs that accommodate the battery cells and are configured isolate the battery cells from one another.

17. The battery pack of claim 1, wherein the lead plate and the lead tab are formed on different planes.

18. The battery pack of claim 1, wherein the same fastener penetrates through all of the bus bar, the lead tab, and the flange.

19. A battery pack, comprising:
a cell holder accommodating a plurality of battery cells;
a flange formed on an exterior side surface of the cell holder and having a plurality of holes;
a lead plate covering electrodes of the battery cells and formed over the flange;
a lead tab extending toward the flange and having a plurality of holes, wherein the lead tab includes a first portion downwardly extending from an end of the lead plate and a second portion outwardly extending from the first portion, wherein the first and second portions are formed on different planes, wherein the holes are formed in the second portion of the lead tab, and wherein the second portion of the lead tab does not vertically overlap the lead plate; and
a fastener inserted into the holes of the second portion of the lead tab and the holes of the flange.

20. The battery pack of claim 19, further comprising a bus bar configured to form an electrical path between the lead tab and an external terminal and having a plurality of holes, wherein one set of the bus bar, the lead tab and the flange are formed on a first side of the battery pack and wherein another set of the bus bar, the lead tab and the flange are formed on a second side of the battery pack opposing the first side.

21. The battery pack of claim 20, further comprising a pack case having a plurality of holes and configured to accommodate the bus bar, the lead tab and the flange, wherein the fastener penetrates all of the holes so as to fix the bus bar, the lead tab and the flange to one another.

* * * * *